(12) United States Patent
Murphy et al.

(10) Patent No.: US 10,360,118 B2
(45) Date of Patent: Jul. 23, 2019

(54) LOW LATENCY SYSTEM HAVING HIGH AVAILABILITY COMPUTER ARCHITECTURE

(71) Applicant: Cboe Exchange, Inc., Chicago, IL (US)

(72) Inventors: Craig G. Murphy, Glenview, IL (US); Paul F. Ciciora, Chicago, IL (US); Steven P. Sinclair, Aurora, IL (US)

(73) Assignee: Cboe Exchange, Inc., Chicago, IL (US)

( * ) Notice: Subject to any disclaimer, the term of this patent is extended or adjusted under 35 U.S.C. 154(b) by 67 days.

(21) Appl. No.: 15/786,091

(22) Filed: Oct. 17, 2017

(65) Prior Publication Data

US 2018/0121301 A1 May 3, 2018

Related U.S. Application Data (60) Provisional application No. 62/409,194, filed on Oct. 17, 2016.

(51) Int. Cl.
| | |
|---|---|
| *G06F 11/00* | (2006.01) |
| *G06F 11/20* | (2006.01) |
| *G06F 3/06* | (2006.01) |
| *G06F 13/28* | (2006.01) |

(52) U.S. Cl.
CPC ........ *G06F 11/2028* (2013.01); *G06F 3/0611* (2013.01); *G06F 3/0617* (2013.01); *G06F 3/0629* (2013.01); *G06F 3/0673* (2013.01); *G06F 13/28* (2013.01)

(58) Field of Classification Search
CPC ............. G06F 11/1008; G06F 11/1064; G06F 11/1068; G06F 11/1072; G06F 11/2028
USPC .................................................. 714/6.1, 6.11
See application file for complete search history.

(56) References Cited

U.S. PATENT DOCUMENTS

| | | | |
|---|---|---|---|
| 2015/0234860 A1* | 8/2015 | Sakaguchi | G06F 11/3485 707/622 |
| 2015/0312337 A1* | 10/2015 | Keremane | H04L 67/1095 709/217 |
| 2018/0364915 A1* | 12/2018 | Li | G06F 12/0875 |

* cited by examiner

*Primary Examiner* — Sarai E Butler
(74) *Attorney, Agent, or Firm* — Brinks Gilson & Lione (57) ABSTRACT

A system is disclosed for processing external inbound messages with failover protection having low latency and high availability. The system includes a primary data processing host and a secondary data processing host. Each of the primary and secondary data processing hosts include a memory space shared by separate data processing components. The memory spaces of the primary and secondary data processing hosts are synchronized using a low-latency remote direct memory access. The synchronization is performed on data items stored in the memory spaces associated with one inbound message at a time.

20 Claims, 7 Drawing Sheets

LOW LATENCY SYSTEM HAVING HIGH AVAILABILITY COMPUTER ARCHITECTURE

CROSS-REFERENCE TO RELATED APPLICATIONS

This application claims the benefit of U.S. Provisional Application Ser. No. 62/409,194, filed Oct. 17, 2016, the entirety of which is hereby incorporated herein by reference.

BACKGROUND

The pervasive use of computing in everyday aspects of life, and particularly business activities, has led to a massive increase in computer messages transmitted every moment of every day. These electronic messages are processed by systems, some of which were never designed to efficiently receive and process such a glut of electronic messages. In particular, some systems receive and process electronic messages of such importance that internal electronic message lost must be kept to a minimum, often approaching zero.

A subset of systems that have near zero fault tolerance levels is financial trading platforms, sometimes referred to as electronic trading systems. These systems receive, process, and transmit messages related to quotes and orders for financial products, such as: securities, futures, options, and bonds. Examples of these systems are used by exchanges, such as: Chicago Board Options Exchange, Chicago Mercantile Exchange, New York Stock Exchange, and NASDAQ.

While these systems have greatly improved access to the world's financial markets, they are subject to potential weaknesses. For example, messages transmitted to and processed by financial trading platforms are subject to both geographic and processing latency. Latency is generally the time it takes, after a message has been transmitted, for the message to be received and processed by a system. For example, if a message is sent to system and is processed one second later, the latency for the message is one second. Geographic latency is latency incurred by the message because of physical distance between the location of system sending and location of the system processing the sent message. Processing latency is latency incurred within a system after the message to be processed has been received and before processing has been completed. While geographic latency is, too a great degree, determined by the physics of communication mediums, such as the speed of light within fiber optic cable, processing latency can be improved through the use of efficient computer architecture.

Another weakness of low fault tolerance systems, sometimes referred to as mission critical systems, is failure of the primary system and the time and data loss associated with bringing online a secondary backup system. A system having this secondary backup system can be referred to as a high availability system. Two primary weaknesses associated with failing over to a secondary system are: the time the system is unavailable to receive and process electronic messages, and any data that is lost by the system during the failover to the high availability system.

Because low fault tolerance systems, such as electronic trading platforms, are only increasing in complexity and use, new advancements in low latency and high availability computer architectures within these systems is in need.

SUMMARY OF THE INVENTION

Methods and systems for providing a transaction system with low latency and high availability are described.

According to a first aspect, a method for managing transactions in a transaction system is described. The method may execute in a transaction system having a primary transaction processing host and a secondary transaction processing host where the primary transaction processing host is currently active and the secondary transaction processing host is configured as a back-up for the primary transaction processing host. The method may include detecting a failover state trigger at the primary transaction processing host. A command and control process of the primary transaction processing host may transmit a message to a call router of the primary transaction processing host instructing the call router to reject inbound transmissions regarding transactions and transmitting a failover message to a first transaction engine of the primary transaction processing host. In response to the failover message from the primary processor, the first transaction engine may reject inbound transmissions and transmit a failover initiation message to the secondary transaction processing host. The method may further include a second transaction engine of the secondary transaction processing host comparing a synchronization state of the secondary transaction process host to a state of the primary transaction processing host to determine if a sufficient synchronization exists between the primary and secondary transaction processing hosts. The first transaction engine may signal external systems to communicate with the secondary transaction processing host, and the second transaction engine may cause a call router of the secondary transaction processing host to forward inbound transmissions to the second transaction engine and transmit a message to the external systems identifying availability of the secondary transaction processing host for inbound transmissions.

The present invention will be more fully understood from the forthcoming description of the embodiments below read in conjunction with the accompanying drawings. Both the detailed description and the drawings are given by way of illustration only, and are not limitative of the present invention as claimed.

DETAILED DESCRIPTION

According to an embodiment of the present invention, the computer architecture of the system provides high availability and resiliency (including sub-second failover and five-minute disaster recovery capability); and low latency and low variability message processing. While embodiments of the herein described computer architecture can be applied to various types of mission critical computer systems, the present description will be in the context of an electronic trading platform. As systems may be programmed according to many different configurations, the particular configuration of the exemplary system described herein is not limiting to the invention.

The embodiments of the present disclosure are implemented using a combination of computer hardware and computer software to form a specialized machine capable of performing in the fashion described in the present disclosure. Embodiments of the present disclosure will be performed utilizing a combination of CPUs, physical memory, physical storage, electronic communication ports, electronic communication lines, and other computer hardware. The computer software utilized will include at least a computer operating system and specialized computer processes described herein.

Figure 1:
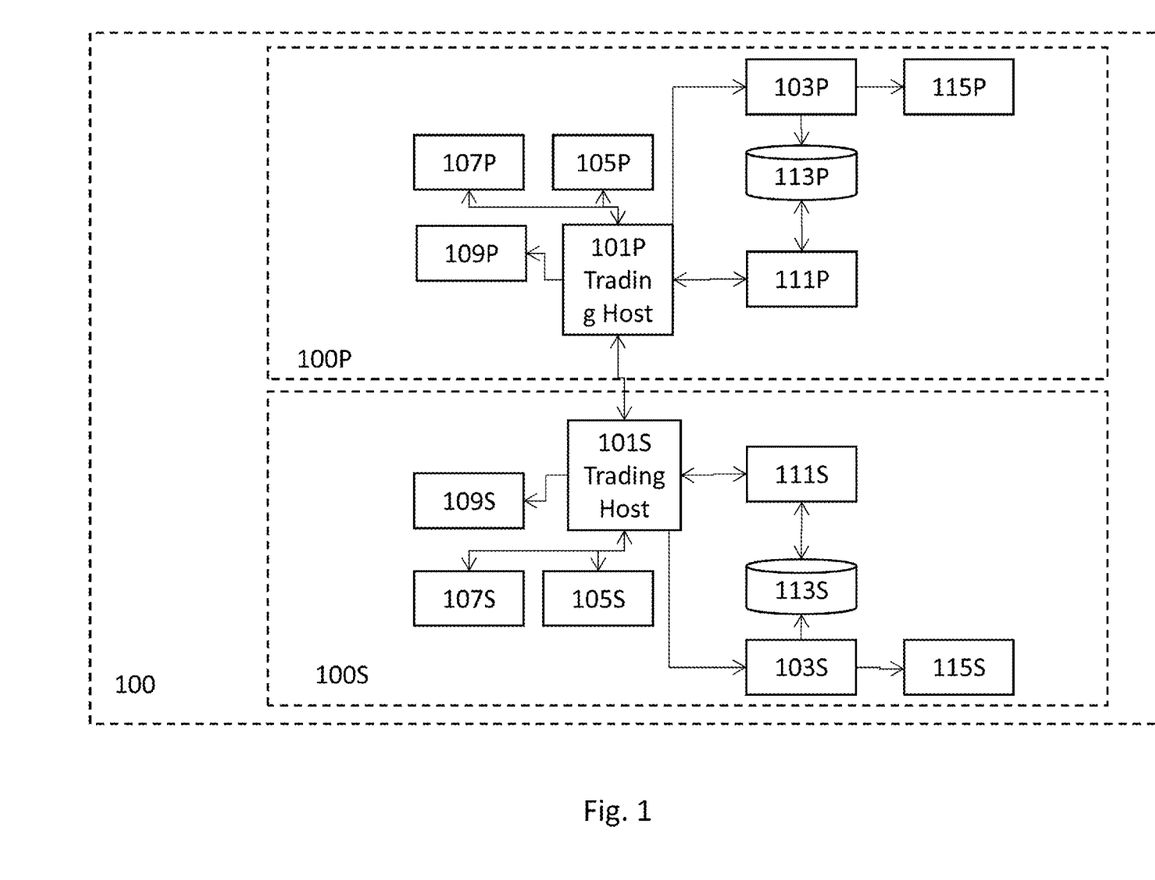
FIG. 1 is a schematic of a system architecture according to the present disclosure.

In the figures and the corresponding descriptions, the use of "P" or "S" following a number denotes that the component associated with the number is either Primary or Secondary. As shown in FIG. 1, an embodiment of electronic trading platform 100 (which is composed of primary system 100P and high availability secondary system 100S) includes trading hosts 101P and 101S; bridge applications 103P and 103S; firm interface gateways (FIGs) 105P and 105S; firm order access gateways (FOAGs) 107P and 107S; clearing system interfaces 109P and 109S; cache tiers 111P and 111S; databases 113P and 113S; and data warehouse services 115P and 115S.

Trading hosts 101P and 101S are the primary components of electronic trading platform 100. Trading hosts 101P and 101S facilitate order processing, creation and distribution of order artifacts, and changes the electronic trading platform's 100 configuration, command, and control. FIGs 105S and 105P provide login credentials and application programming interface (API) access to user systems accessing electronic trading platform 100. FOAGs 107P and 107S enable user systems to access electronic trading platform 100 via a standardized communication protocol. For example, the financial exchange protocol (FIX) is a common language that financial systems use to exchange information. Clearing system interfaces 109P and 109S are used to provide order match and execution information to order clearing systems at a clearing corporation, such as the Options Clearing Corporation or the Chicago Mercantile Exchange. Cache tiers 111P and 111S provide real-time updates to components that are configured to receive updates. Additionally, the cache tiers 111P and 111S provide startup information to electronic trading platform 100 components during system startup and initialization. Databases 113P and 113S store information from electronic trading platform 100 for a preconfigured period of time for rapid retrieval before transmitting the information to the data warehouse services 115P and 115S. The data warehouse services 115P and 115S store information from electronic trading platform 100 in database structures (e.g., a relational database structure) for long term storage. Communications between the components shown in FIG. 1 are denoted by arrows.

While the embodiment shown in FIG. 1 includes a backup for each component, it is not necessary that all embodiments have such redundancy. For example, it is possible that different embodiments will have different levels of redundancy and different degrees of high availability. Additionally, information can be sent to and/or received from electronic trading platform 100 in a variety of ways and interfaces. For example, the user systems could interface with databases 113P and 113S to view system artifacts or order/trade information. User systems could interface with the cache tiers 111P and 111S for information related to administration, operation, and risk management of electronic trading platform 100. Many of the components shown in FIG. 1 are discussed in greater detail below.

Figure 2:
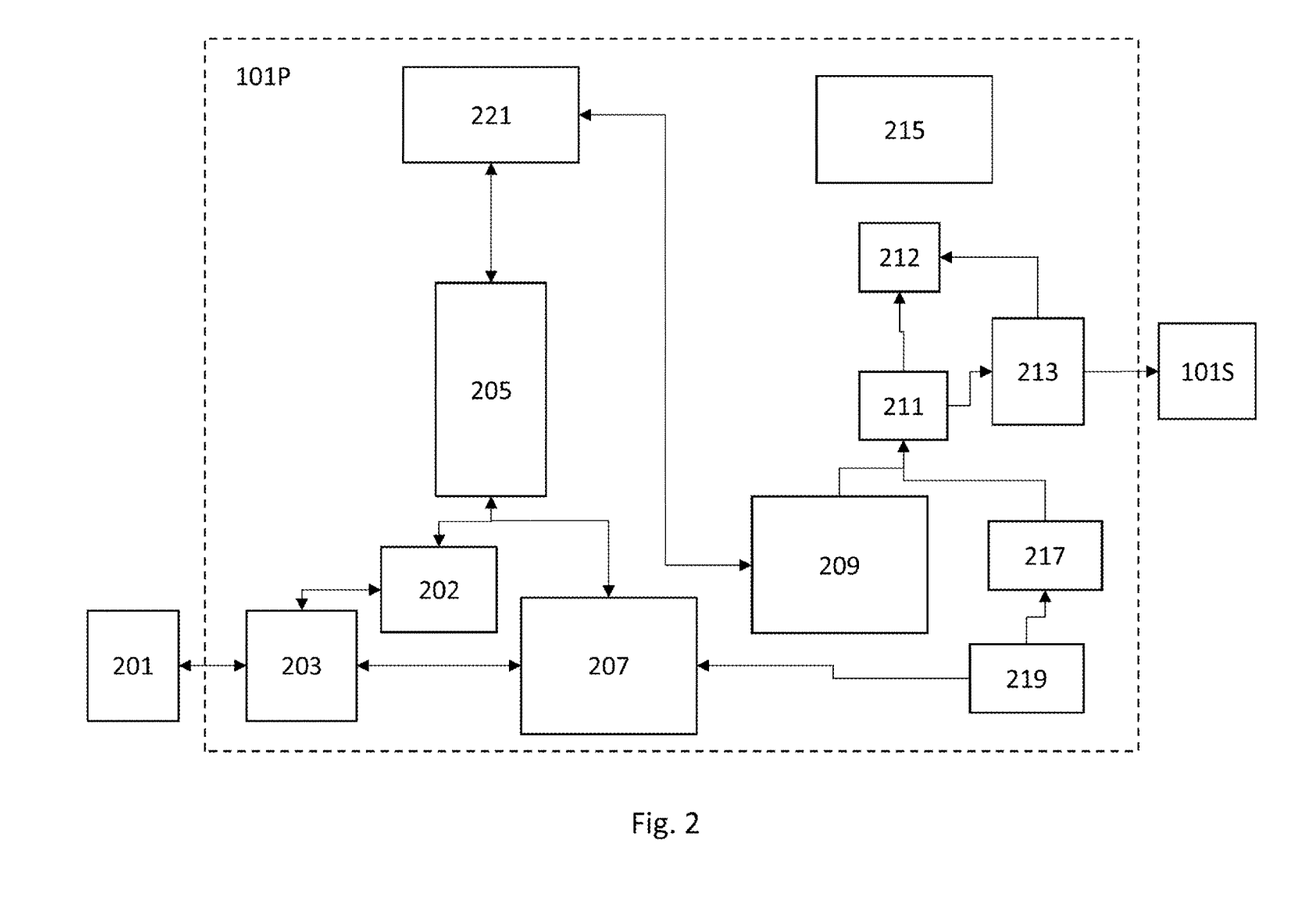
FIG. 2 is a schematic of a primary trade host system architecture according to the present disclosure.
Figure 3:
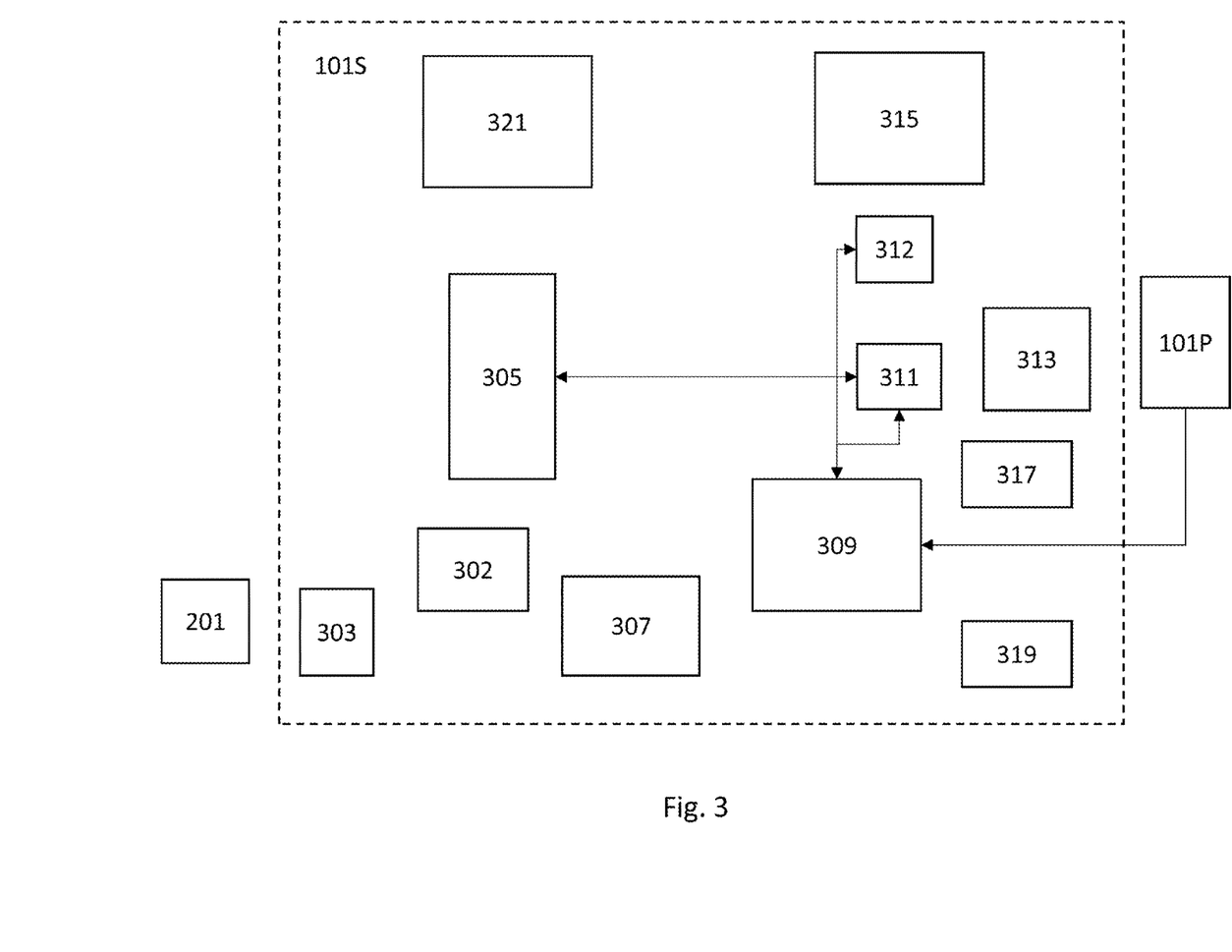
FIG. 3 is a schematic of a secondary trade host system architecture according to the present disclosure.

FIG. 2 shows an embodiment of trading host 101P. Trading host 101P accepts incoming order or quote related messages from systems accessing electronic trading platform 100; processes these messages (e.g., placing information into the order book, executing a trade, or cancelling a pending order or quote); creates and distributes artifacts for each message; receives and processes system configuration updates and commands; and provides data to the secondary trading host 101S. According to an embodiment, trading host 101P has sub-components, including: call router 203; serially executed trading engine (SET) 205; trade region memory 207; transporter region memory 209; artifact multiplexer 211; high availability transporter (transporter) 213; SET shared memory (shared memory may be referred to as SHMEM) 202; transporter SHMEM 212; and command and control process 215. While FIGS. 2 and 3 show a single SET 205, a system according to embodiments of the present disclosure could include multiple SETs 205 and multiple SHMEMs 202 (each SET 205 having a SHMEM 202). Each of these components and their interactions are described in further detail below. According to embodiments of the present technology, trading host 101P may include cold host recovery processes, market data reporting processes, trade maintenance services, and other processes required to business operations, which may vary depending on the business environment in which the low latency high availability system disclosed herein is implemented.

Transporter 213 utilize remote direct memory access (RDMA) protocol to seamlessly extend response regions across multiple hosts. This allows for messages to be transmitted between distinct servers without the use of messaging wrappers, which if used would greatly increase the transmission latency of the messages. The use of RDMA allows for cross server latencies to be reduced to 1-3 microseconds depending on payload size.

Trading host 101P may be accessed by user computer systems 201 directly or indirectly, via FIG 105P or FOAG 107P. Electronic communications transmitted to trading host 101P are received at the call router 203. Call router 203 receives order, cancel, and order update messages from user computer systems 201; validates the received messages; routes the messages to the appropriate SET 205; receives acknowledgment messages from report processor 219 (which is in communication with report processor SHMEM 217); and transmits them to user systems 201; and creates audit artifacts and places the artifacts' message IDs on the queue of a batching audit process, which is not shown.

Once received at the call router 203, the incoming data packets or packages are parsed to retrieve messages (such as trading orders) and a retrieved message, or artifact is placed into trade region memory 207. Once the artifact is placed into memory in the trade region memory 207, SET SHMEM 202 is updated to contain the location of the artifact in memory. This step is critical for the low latency processing of the system. In legacy high electronic message volume systems (such as legacy electronic trading platforms), artifacts are continuously copied and transmitted to appropriate subcomponents for necessary processing. Thus, if the same artifact was needed by five subcomponents for processing, five copies of the message would be generated and transmitted in the system. Each copy and transmission added latency to the eventual completion of message processing. According to embodiments of the present technology, SHMEMs are used to allow disparate sub-processes to locate artifacts in response regions. Through this coordination, necessary data is stored once and accessed multiple times, but not repeatedly copied and transmitted. This reduction in copying and transmission within the system reduces the latency experienced in message processing. Additionally, the use of response regions and SHMEMs allows for nonintrusive monitoring of system resources and tuning of the system during production.

Additionally, embodiments of the present disclosure provide a call router 203 which provides for strict ordering from an electronic message being read via a network interface controller (NIC) to a message being dispatched to SET 205. That is, messages are processed by SET 205 in the same order as they are received into the system through the NIC and call router 203. According to an embodiment of the present disclosure, this is accomplished by having three processing threads run simultaneously each with a unique task. Thread 1 reads with NIC using a vendor supplied protocol that lets the read thread know the order in which messages arrived at the NIC. The second thread inspects the message header and performs the dispatch to SET 205. The third handles the reply from report processor 219 and routs the message to be archived for auditing.

The trade region memory 207 is accessed by SET 205, according to artifact location information on the SET SHMEM 202. According to embodiments of the present disclosure, there may be multiple SETs 205. If a system has multiple SETs 205, the call router 203 may be configured such that particular SETs 205 create and access artifacts from particular messages that are stored in the trade region memory 207. For example, within electronic trading platform 100, particular SET 205 may be responsible for handling artifacts associated with orders pertaining to AAPL securities or derivatives. According to an embodiment, SET 205 executes orders, cancels, updates order messages received by the call router 203, and forwards artifacts to artifact multiplexer 211; artifact multiplexer 211 forwards the artifact to report processor 219; report processor 219 transmits acknowledgement messages to call router 203; and artifact region 221 creates artifacts that are placed into transporter region memory 209. Artifact multiplexer 211 accesses transporter region memory 209, copies the artifacts, and distributes them to transporter 213. Transporter SHMEM 212 is not active while trade processor 101P is active as the primary trade processor. The secondary transporter SHMEM 312 functionality is described below, and should trade processor 101P become the secondary the functionality to transporter SHMEM 212 would mirror that of transporter SHMEM 312.

Transporter 213 is a subcomponent that move artifacts from the primary trading host 101P to the secondary trading host 101S. Transporter 213 plays an essential role in that the moving of artifacts from the primary trading host 101S to the secondary trading host 101S keeps the trading hosts in sync, which allows for the rapid failover of the high availability electronic trading platform 100.

Additionally, according to the preferred embodiment of the technology transporter 213 transports only a single artifact at a time. Another way of expressing this concept is that there is only one artifact inflight at any single point in time. This technology benefits the high availability system in two ways. First, as discussed above, systems having low fault tolerance need to ensure (to a high degree) data integrity. Second, by maintaining a high degree of data integrity, the ability to failover quickly and without incident is enhanced, which increases the availability of the system during disruptive events (e.g., system failures).

Command and control process (C&C) 215 provides a number of functions to trading host 101P. According to one embodiment, C&C 215 is responsible for failover monitoring and control, automatic and manual state changes, triggering the rebuilding of critical data structures (e.g., the state of the electronic trade book), cold start functionality, and system alarm functionality. Though C&C 215 provides command and control functionality for trade host 101P, other C&C processes provide command and control functionality to system sub-components, including (but not limited to): trading host 101S; FIGs 105P and 105S; and FOAGs 107P and 107S.

As shown in FIG. 3, trade host 101S is a redundant system to trade host 101P. In this regard trade host 101S has all of the same components as trade host 101P, though not all electronic message pathways are active as trade host 101S is not active unless a failover from trade host 101P is initiated. According to an embodiment of the present invention, trade host 101S has sub-components, including: call router 303; SET 305; trade region memory 307; transporter region memory 309; artifact multiplexer 311; transporter 313; SET SHMEM 302; transporter SHEM 312; command and control process 315, report processor SHMEM 317, report processor 319, and artifact region 321.

Each of these components and their interactions are described in further detail above with reference to FIG. 2. According to embodiments of the present technology, trading host 101S may include cold host recovery processes, market data reporting processes, trade maintenance services, and other processes required to business operations, which may vary depending on the business environment in which the low latency high availability system disclosed herein is implemented.

According to an embodiment, the trade hosts 101P and 101S have report processor subcomponents 219 and 319, respectively. Report processors 219 and 319 send outbound electronic messages from the system to user systems 201. For example, the report processors 219 and 319 may send electronic communications detailing order fill reports, order cancel reports, new order reports, and drop copies of order messages to user systems 201.

While trade host 101P is active, artifacts are received via transporter 213. Transporter 213 transmits artifacts between trade hosts 101P and 101S. When an artifact is received by trade host 101S, the transporter 213 places the artifact into transporter region memory 309 which is then accessed by SET 305 via artifact multiplexer 311. This is important as latency during this period may cause undue delay in trade host 101S seamlessly resuming normal operation of electronic trading platform 100. According to an embodiment, when an artifact is received by trade host 101S, the transporter 213 places the artifact into transporter region memory 309 and transmits the artifact to SET 305 via the artifact multiplexer 311.

Figure 4:
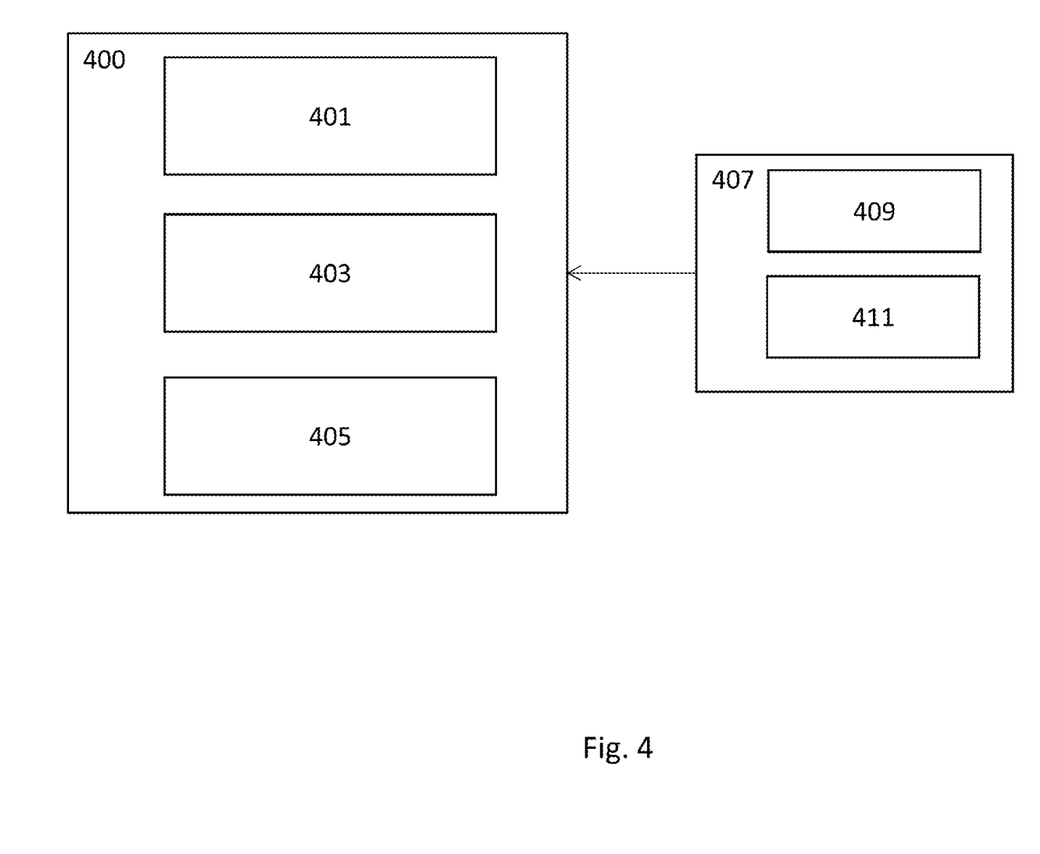
FIG. 4 is a schematic of a response region according to the present disclosure.

FIG. 4 shows the components and structure of response region memory used by embodiments of the present system. For example, the transporter region memories 209 and 309. According to an embodiment, the response region 400 contains status array 401; free queue 403; and finished queue 405. Status array 401 has a header that contains artifact information, configuration, and state information. The artifact information in the header is kept on an artifact basis, thus there is a status array entry in status array 401 for each artifact in the response region 400. Free queue 403 is a series of memory locations (referred to herein as messages 407) in which artifact contents 411 are generated by processes or sub-process such that the artifact contents 411 are available to be accessed according to operating need. According to embodiments of the present disclosure artifact contents 411 are individually predefined binary data packets. These data packets represent business data, including (but not limited to) orders, trades, market data, instrumentation, and other data necessary to trading systems. Systems according to the present disclosure need not be related to trading systems. For example, the architecture of the present disclosure could be used in any endeavor necessitating rapid and low fault communication, such as nuclear power plants. These data packets are bundled to form artifact contents 411. The contents of the bundled data packets are indexed using a bitmap image. This bitmap image (referred to a presence map) is scanned by processes receiving message 407 to determine if further processing of the message 407 is necessary. Put another way, the presence map acts as a table of contents for message 407, allowing the reader (which is looking for a specific payload) to quickly determine if message 407 may be skipped without processing. According to embodiments of the present disclosure, this process allows artifacts to span multiple messages should the artifact bundle exceed the per message threshold.

According to an embodiment, each originator process or sub-process that creates artifact contents 411 in messages 407 within response region 400 has its own free queue 403, which has a predefined number of messages 407 (i.e., memory locations in which artifact contents 411 may be generated). For example, if there are two originating processes and each free queue 403 has 10,000 messages 407, the total number of messages 407 is 20,000. Finished queue 405 is a queue of messages 407 containing artifact contents 411 that have completed the prescribed processing and are available for post processing prior to being added back to the free list. According to an embodiment, the finished queue 405 is sized to be able to hold the total number of messages 407 from all originating processes. For example, if the total number of messages 407 of all originating processes is 20,000, finished queue 405 is at least capable of holding 20,000 messages 407. According to an embodiment of the present invention, messages 407 having artifact contents 411 are stored and processed within response regions according to a first in first out (FIFO) scheme. According to other embodiments, messages 407 having artifact contents 411 may be stored and processed according to alternate processing schemes.

According to an embodiment, message 407 contains an artifact header 409 and artifact contents 411. According to an embodiment, artifact header 409 contains information related to artifact contents 411. According to an embodiment of the present disclosure, artifact header 409 is a unique transaction identification code for a single transaction that was sent to electronic trading platform 100. Artifact contents 411 is the payload of message 407. According to an embodiment, artifact contents 411 pertain to orders, quotes, or other communications relevant to electronic trading platform 100. According to other embodiments, artifact contents 411 would be relevant to the type of system implementing embodiments of the systems described herein.

The following is a description of response region 400. Message 407 is requested from free queue 403, in response region 400. According to the present disclosure, artifact contents 411 and artifact header 409 are created within message 407. Said another way, message 407 acts as a container for artifact contents 411 and artifact header 409. According to an embodiment of the present disclosure, information in the artifact header 409 may be used to populate status array 401. Then the location of the artifact contents 411 is placed onto a SHMEM that can then be accessed by processes and sub-processes to determine the location of message 407. Processes and sub-processes then can access (or in some embodiments "check-out") the messages 407 having artifact contents 411 on response region 400. As discussed above, this process of accessing information on the response regions lowers processing latency by lowering the amount of data duplication within the present system. All other factors held constant, this lowering of processing latency increases the speed and responsiveness of the present computer system.

As processes and sub-processes access response region 400 and messages 407 having artifact contents 411, status array 401 corresponding to message 407 is altered to account for the processing of the message 407 having artifact contents 411. According to an embodiment of the present disclosure, the process responsible for dispatching the message 407 provides information to the status array 401 regarding the number of times the artifact contents 411 needs to be processed. According to an embodiment, an identification for each processor of message 407 is included in status array 401. For example, message 407 having artifact contents 411 stored in the transporter region memory 209 needs to be transported to components of trade host 101S a particular number of times. As each transport is completed, status array 401 corresponding to the transported message 407 having artifact contents 411 is decremented from the total number of transports needed. Once the decrement reaches zero, the system recognizes that message 407 having artifact contents 411 needs no further processing and message 407 can be moved to finished queue 405. According to an embodiment, messages 407 on the free queue 403 are overwritten on a first in first out basis. According to other embodiments of the present disclosure, the scheme for managing finished queue 405 may be different.

Figure 5:
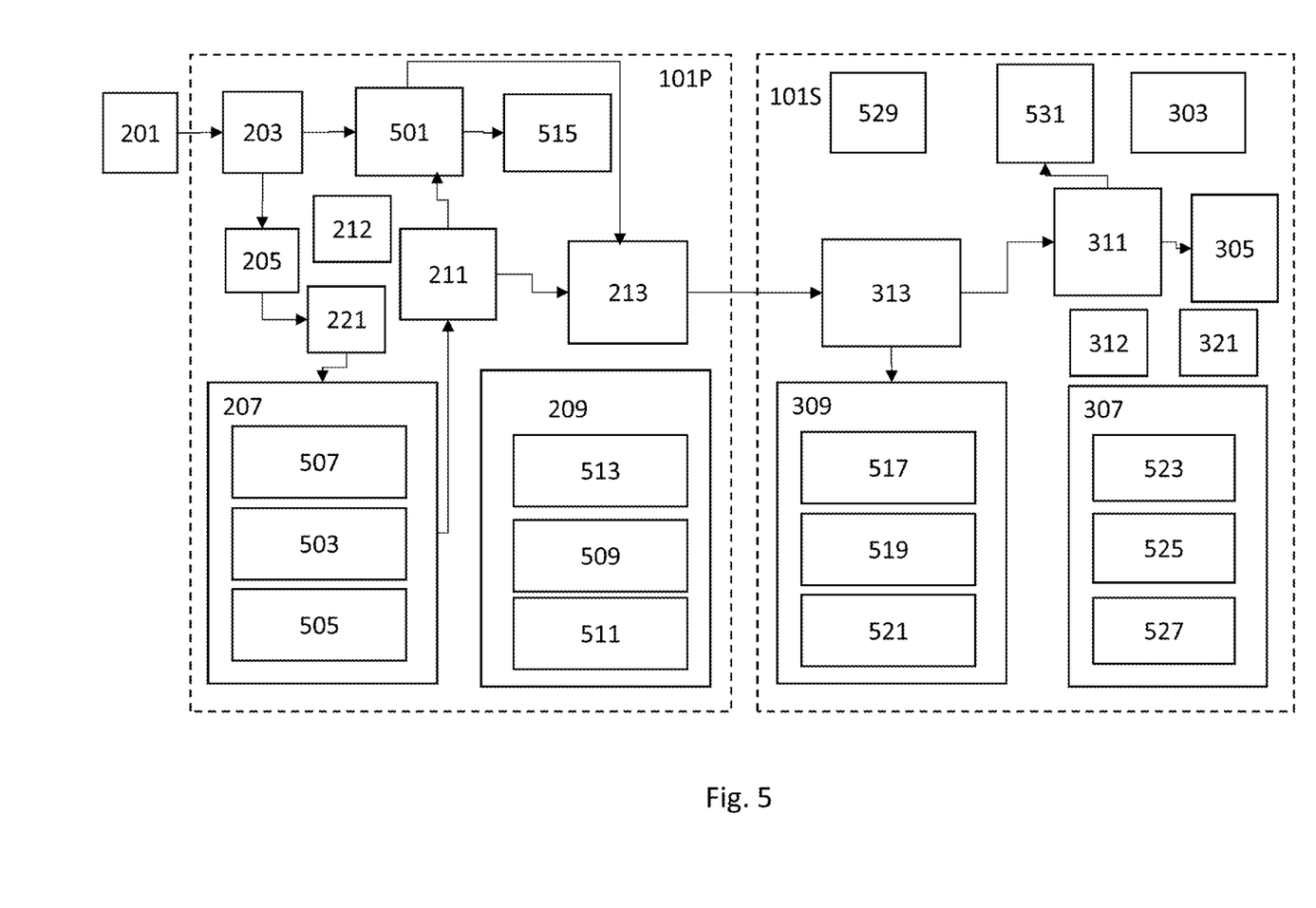
FIG. 5 is a schematic of a system architecture according to the present disclosure.

FIG. 5 is a flow diagram detailing an embodiment of the components used to maintain the high availability nature of the system described herein. Because FIG. 5 is meant to show the information flow between trade host 101P and trade host 101S, some components of the system (some of which are shown in other figures and described above) have been omitted, but (according to embodiments of the present disclosure) would be present in a system implementation of the current subject matter. As shown in FIG. 5, according to an embodiment, user systems 201 access trade host 101P via an electronic connection to call router 203, and electronically transmits a user message from user systems 201 to call router 203. According to an embodiment of the present disclosure, the electronic connection may be via the Internet or other public/private lines of electronic communication. The user messages may be received as data packages (e.g., TCP packages).

Each data package may include hierarchical levels of data payloads and headers according to various data transport protocols. Data payloads of the data packages may contain artifacts, e.g. trading orders or quotes. Data payload of a data package may contain multiple artifacts. In some cases, data for an artifact may be segmented and transmitted from the user system 201 across multiple data packages. Call router 203 transmits the user messages to SET 205, where the user messages are processed and artifacts contained in the user messages are extracted and placed in the artifact region memory 221. SET 205 further sends the artifact to the trade region memory 207. According to an embodiment, as further described in FIG. 4, an artifact message 407 containing an artifact created by SET 205 in artifact contents 411 is created in artifact region memory 221. Further, as message 407 having artifact contents 411 is accessed and processed by system processes and sub-processes, status array 507 is updated to reflect the processing that has occurred, as described in relation to FIG. 4. Upon completion of processing of message 407 having artifact contents 411, message 407 is moved to finished queue 505, as described in relation to FIG. 4.

Additionally, SET 205 sends message 407 having artifact contents 411 to artifact multiplexer 211. According to other embodiments of the present disclosure, the artifact is then placed into transporter region 209 accessed by transporter 213 via transporter SHMEM 212. The artifact is then transported from the transport region 209 of the primary trade host 101P to the transport region 309 of the secondary trading host 101S using hardware supported RDMA. When transporter 213 completes its transmission of the artifact, the status of message 407, having artifact contents 411, in the artifact header 507 in trade region memory 207 is updated accordingly to indicate that the transfer of the artifact between the hosts 101P and 101S has completed.

Additionally, according an embodiment of the present disclosure, artifact multiplexer 211 makes the artifact available to various downstream processes 515 that utilize the artifact buy placing the address of the artifacts on each SHMEM. According to an embodiment, downstream processes 515 could include: processes that store and transmit market data to customers, processes that store trade information for a cold system recovery (a recovery that requires the system to be restarted) should one be needed, auditing processes, and processes that transmit data to backend systems that are utilized to track and effectuate trades. These processes are exemplary in that there are many other downstream processes 515 that could utilize the transmitted artifact. Artifact multiplexer 211 also copies the artifact to report processor 501. Report processor 501: generates a report in response region 400, sends the report's message identification to call router 203, and sends the report's message identification to transporter 213, which transmits the report to transporter SHMEM 312, and sends the report identification to artifact multiplexer 311, which transmits the report identification to report processor 531.

According to an embodiment of the disclosure, a system process decrements a counter beginning with a determined number wherein the determined number can be a predefined number or other system defined number representative of a number of processes that can access the corresponding data. Each increment or decrement of the determined number represents a transmission and/or process. Certain processes, such as the processing performed by the transporter, help to ensure that little or no data is lost in the event that the primary trade host 101P is compromised and secondary trade host 101S is made the active trade host. This process is described in relation to FIG. 4.

According to embodiments of the disclosure, transporter 213 sends artifacts to high availability trade host 101S. As noted above, according to embodiments of the present invention, while trade host 101P is active as the primary trade host, many of the internal process and sub-process transmissions within secondary trade host 101S will not be active. Should secondary trade host 101S become the active trade host, all necessary transmission pathways would become active. For example, should the fail-over from primary trade host 101P to secondary trade host 101S, user systems 201 would access trade host 101S via call router 303.

Transporter 313 receives transmitted artifacts from primary trade host 101P, and copies the received artifacts into transporter region memory 309. According to an embodiment, transporter 313 adds message 407 by placing an entry in a cross reference queue which is a part of transporter region memory 309 that allows mapping back to its original location in 207. Message 407 contains the message identification of the artifact from the trade region memory 207 and the message identification of the artifact from the transporter region memory 309. This enables the artifact to be located in both memory regions, i.e., cross-referenced. More specifically, this computer process facilitates the communication of message state updates between 213 and 313 such that 313 can mark message 407 as completely processed by 101P.

Transporter 313 copies the artifact message identification to artifact multiplexer 311, which sends the artifact message identification to SET 305. SET 305 then populates trade region memory 307. As the process of transmission of artifacts and copying of artifact message identifications takes place, a counter having a number of predefined increments is decremented, ensuring that each artifact message is properly received and processed by the system. This process of decrementing is described above in reference to FIG. 4.

Following the above described message and process flow, a "complete" message is processed on trade host 101S. This message is generated following the completion of the last required process, this may vary depending on the implementation of the herein described subject matter, the environment of system implementation (i.e., a system running a nuclear power plant likely has different computer processes than a complex financial trading system—though both systems would benefit from the reduction of processing latency and the better high availability of the present disclosure), and the requirements of the individual system architecture. According to the present embodiment, transporter 313 sends the "complete" message to transporter region memory 309. This process decrements a predefined counter, as described above in relation to FIG. 4.

Upon completion of the above described flow, the data on the primary and secondary trade hosts 101P and 101S is, to a high degree (according to an embodiment of the present disclosure, the data will be identical to within one message), identical. Because the process of transmitting data from trade hosts 101P to 101S is completed with a maximum of one in-flight message, the maximum data loss due to a critical system error is one message. According to embodiments of the disclosure, should the fail-over from trade host 101P to trade host 101S take place without trade host 101P being unrecoverable, it is possible to reverse the process and architecture shown in FIG. 5 such that trade host 101S begins to act as the primary trade hosts and trade host 101P acts as the high availability backup system.

The message processing and synchronization approach described above provides a technical solution for reducing latency and improving availability and consistency for message processing. For example, in the solution above, artifacts are placed in shared memory space once extracted from data packages from a user. Unlike a conventional message processing system, where each processing component or thread processes the artifacts by repeatedly reading the data packages and relying on functions of an operating system to unpack the data packages, the processing components in the solution above access a shared memory storing the artifacts unpacked from the data packages once. Repeated involvement from the operating system is thus dramatically reduced during message processing, leading to greatly reduced processing latency. Further, hardware supported RDMA synchronization between the primary host (101P) and the secondary host (101S) removes the synchronization latency experienced in a conventional redundant message processing system where synchronization is achieved by transmitting data packages requiring substantial amount of processing overhead. In addition, the processing status and synchronization status of artifacts are closely tracked in the solution above via the status array 401 of FIG. 4 for each shared memory space. As such, a system snapshot is maintained for achieving failover with high availability.

Figure 6:
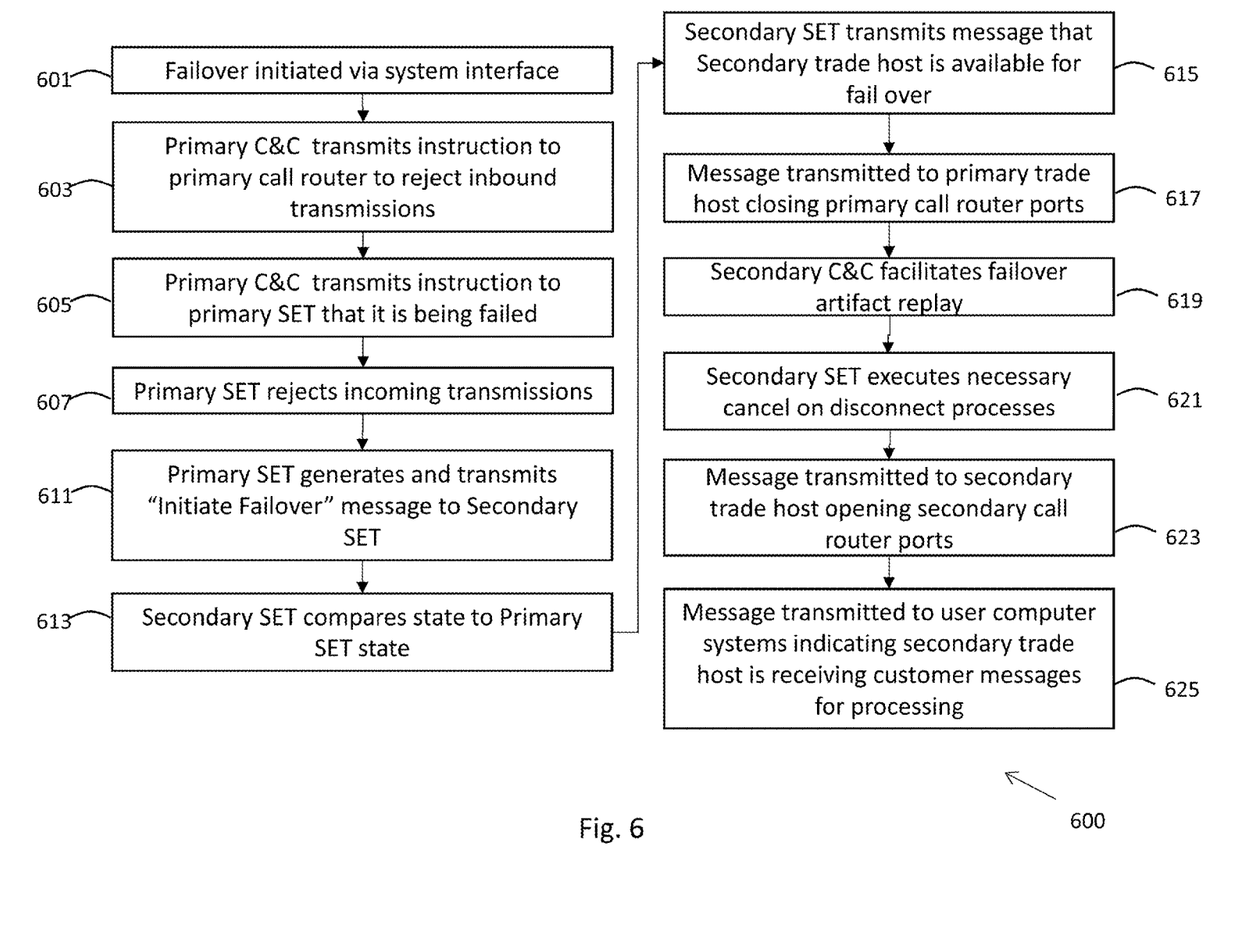
FIG. 6 is a flow diagram of a failover process according to the present disclosure.

According to embodiments of the present disclosure, the system architecture allows for a seamless failover from trade host 101P to trade host 101S with little or no loss of data. FIG. 6 shows flow diagram 600 of the steps taken, according to one embodiment of the present subject matter, to failover to trade host 101S. In particular, what is described can be termed a fast failover, in that it requires essentially no system outage and (according to an embodiment of the present disclosure) is completed in less than 100 milliseconds. At step 601, a failover is initiated via a system interface. This interface may be a graphical user interface or some other command based interface that provides for instructions to be transmitted into the system by a user. According to an embodiment of the present disclosure, the failover is initiated automatically by a secondary monitoring process using predefined system health criteria evaluates the status of trade host 101P and upon detecting a failover event initiates the failover. According to embodiments of the subject matter, a combination of system health criteria (taken alone or in combination) may indicate the need for a failover—i.e., a failover event. Exemplary system health criteria may include one or more process in 'alarming' state; one or more process in 'nonresponsive' state; and a buildup of messages in a trade region, which would be indicative of one or more components not finishing their processing. This monitoring may be accomplished by the C&C processes 215 and 315.

At step 603, the C&C process 215 transmits instruction to call router 203 to reject inbound transmissions from user computer systems 201. This is the first step in transitioning from primary trade host 101P to secondary trade host 101S. At this step, communications are stopped from entering the system. At step 605, C&C process 215 transmits instructions to SET 205 that it is being failed. This step provides the basis for step 607 where SET 205 rejects any incoming transmissions. According to an embodiment of the subject matter, this is necessary to arrive at a state of SET 205 that can be used during the failover. At step 611, SET 205 (i.e., the primary SET) generates and transmits an "initiate failover" message to SET 305 (i.e., the secondary SET). According to an embodiment of the present invention, the "initiate failover" message provides instruction to SET 305 to take the proper steps for failover.

At step 613, SET 305 compares the process state of SET 305 to the process state of SET 205 to determine if the SET states are in sync and available for failover. According to an embodiment of the present subject matter, tolerances for differences between the states of SETs 205 and 305 can be defined, such that the SET states need not be perfectly in alignment to allow for failover. Rather, depending on the tolerance of the implementation of the present subject matter, SET states may need to be more or less in sync to allow for failover. This allows leeway for inactive or test instruments to be out of sync. At step 615, after determining that the states of SETs 205 and 305 are either in sync (or according to embodiments of the present subject matter, in sync enough) SET 305 creates and transmits a message to SET 205 indicating that trade host 101S is available for fail over.

At step 617, SET 205 calls a command on C&C process 215 instructing it to initiate go disabled and to close all communication ports. This is done in order to signal user systems 201 that trade host 101S is being activated. At step 619 artifact replay is initiated by transporter 313 when it sees a failover artifact. Transporter 313 sends all system components a start replay artifact followed by the replayed artifacts followed by an end replay artifact. According to an exemplary process, the failover artifact replay performs the following steps: Transporter 313 goes through the cross reference array (as described above) to identify artifacts that were not fully distributed to downstream processes, adds the not fully distributed artifacts to the artifact multiplexor SHMEM according to timestamp (though in other embodiments other criteria could be used), and directs artifact multiplexer 311 to distribute the queued artifacts to downstream processes.

According to other embodiments of the present subject matter, the process by which the states of trade host 101P and 101S (and the processes located thereon) are synched may be accomplished via a different manner. At step 621, SET 305 executes necessary cancel on disconnect processes. Step 621 protects system users from being in a vulnerable position when they are no longer connected and able to adjust their positions. At step 623, a message is transmitted from SET 305 to C&C process 315 to instruct call router 303 to begin forwarding to the SET 305. This message forwarding enable communications from user computer systems 201 to trade host 101S, once trade host 101S is the active trade host. At step 625, secondary trade host 101S generates and communicates a message to user computer systems 201 indicating that trade host 101S is available to receive user computer communications. According to embodiments of the present disclosure, it is contemplated that some of the steps shown in process 600 may be omitted or taken out of order.

According to an embodiment of the present subject matter, it may not be possible to utilize the process described in FIG. 6 to failover from primary trade host 101P to secondary trade host 101S. This is generally the case when the primary trade host 101P has been deemed too unreliable and unstable to use the failover method of FIG. 6, as described above. In this situation, it is possible to failover to the secondary trade host 101S without a system outage (less than 100 milliseconds) provided the state of the secondary trade host 101S is sufficiently synched with the state of primary trade host 101P. As discussed above, according to embodiments and implementations of the current subject matter, different levels of tolerance related to the sync of trade hosts 101P and 101S may be acceptable.

Figure 7:
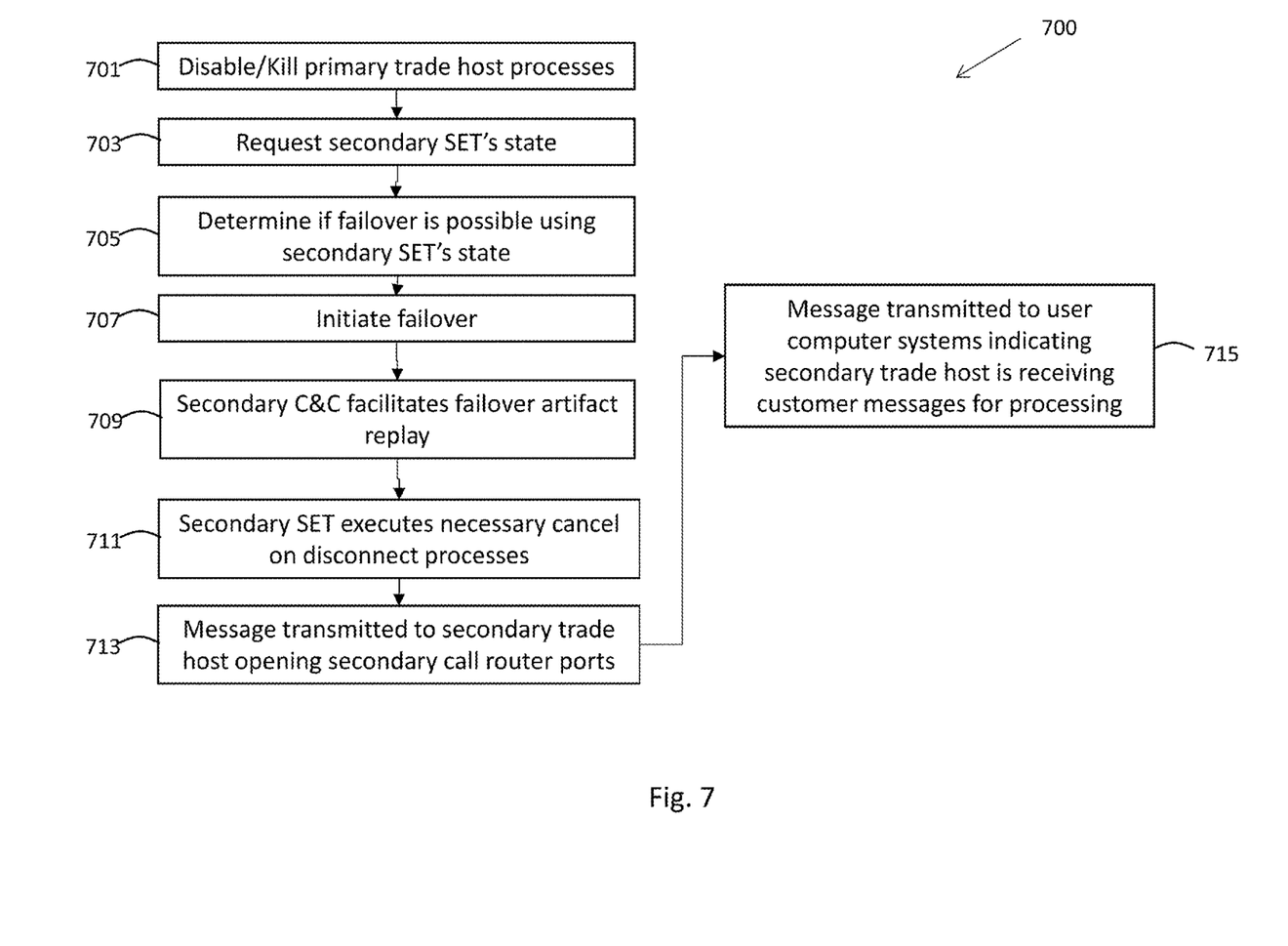
FIG. 7 is a flow diagram of a failover process according to the present disclosure.

Process 700 as shown in FIG. 7, is a flow diagram of an exemplary process used to failover when the primary trade host 101P is deemed too unreliable and unstable to complete the failover process shown in FIG. 6 and described above. At step 701, primary trade host 101P processes are disabled or killed. According to an embodiment of the present subject matter, if the system is undertaking a disable primary failover, secondary C&C process 315 transmits a message to call router 203 (via primary C&C process 215) to close the ports of call router 203. Additionally, the secondary C&C process 315 instructs artifact multiplexer 211 to halt its processes with the exception of processes related to transporter 213. Alternatively, if the system is undertaking a kill primary failover, primary trade host 101P is halted via a user initiated process. According to an embodiment of the present subject matter, a system may be configured to provide a kill failover and thus an automated halt of primary trade host 101P should trade host's 101P operation not meet predefined performance boundaries.

At step 703, the secondary SET's 305 state is requested, and at step 705 the secondary SET's 305 state is interrogated in order to determine if the state is current enough for a fail over to occur. If it is determined that the secondary trade host 101S is capable of assuming the primary position, at step 707a failover is initiated.

At step 709 C&C process 315 facilitates the failover artifact replay. According to an exemplary process, the failover artifact replay performs the following steps: C&C process 315 goes through the cross reference array (as described above) to identify artifacts that were not fully distributed to downstream processes, adds the not fully distributed artifacts to a queue according to timestamp (though in other embodiments other criteria could be used), and directs artifact multiplexer 311 to distribute the queued artifacts to downstream processes.

At step 711, SET 305 executes necessary cancel on disconnect processes. At step 713, a message is transmitted from SET 305 to trade host 101S to instruct call router 303 to begin forwarding messages. This forwarding of messages is what will enable communications from user computer systems 201 to trade host 101S, once trade host 101S is the active trade host. At step 715, secondary trade host 101S generates and communicates a message to user computer systems 201 indicating that trade host 101S is available to receive user computer communications. According to embodiments of the present disclosure, it is contemplated that some of the steps shown in process 700 may be omitted or taken out of order.

What is claimed is:

1. A method for processing inbound messages from external systems with low latency and high availability failover protection, comprising:
   receiving sequentially the inbound messages by a primary data processing host;
   executing separate data processing components in the primary data processing host to process the inbound messages;
   creating in the primary data processing host a first memory space for storing data items associated with the inbound messages wherein the first memory space is accessed by and is common to the separate data processing components;
   executing a synchronization component in the primary data processing host to synchronize the first memory space and a second memory space of a secondary data processing host with respect to one of the inbound messages at a time via a remote direct memory access; and
   upon detecting a failover condition by the primary data processing host:
      rejecting, by the primary data processing host, further inbound messages;
      transmitting, by the primary data processing host, a failover message to the secondary data processing host; and
      upon receiving the failover message and determining, by the secondary data processing host, a synchronization state between the first memory space and the second memory space being higher than a predetermined threshold:
         signaling, by the primary data processing host, the external systems to communicate further inbound messages with the secondary data processing host; and
         processing the further inbound messages by the secondary data processing host.

2. The method of claim 1, wherein each of the separate data processing components accesses the first memory space via a memory index containing memory locations of data items in the first memory space.

3. The method of claim 1, wherein the inbound messages comprise requests for financial transactions.

4. The method of claim 3, wherein the requests for financial transactions comprise orders to buy or sell securities, requests to cancel orders, or requests for quotes.

5. The method of claim 1, wherein the failover condition comprises a predetermined system health criteria for the primary data processing host.

6. The method of claim 5, wherein the predetermined system health criteria comprises at least one of a processing component being in an alarming state, being in nonresponsive state, or a predetermined amount of buildup of pending inbound messages.

7. The method of claim 1,
   wherein the first memory space and the second memory space each comprises a message processing region and a transport region;
   wherein the synchronization component in the primary data processing host is executed to synchronize data items between the transport region of the first memory space and the transport region of the second memory space via the remote direct memory access; and
   wherein the message processing region of the second memory space is synchronized to the message processing region of the first memory space by updating the message processing region of the second memory space from the transport region of the second memory space within the secondary data processing host.

8. The method of claim 1, further comprising parsing the inbound messages by the primary data processing host to obtain the data items associated with the inbound messages.

9. The method of claim 1, wherein latency for the synchronization component due to the remote direct memory access is less than 10 microseconds.

10. The method of claim 1, wherein the inbound messages are processed by the separate data processing components in the primary data processing host with strict order determined by an order in which the inbound messages are received by a call router of the primary data processing host.

11. The method of claim 1, wherein the first memory space comprises:
   a status array for indicating processing progression of the inbound messages;
   a free queue containing currently unused memory addresses that are allocable to the separate data processing components; and
   a finished queue containing data items associated with the inbound messages that have been completely processed by the separate data processing components.

12. A fault tolerant data processing system, comprising:
   computer hardware comprising:
      a primary data processing host including a first memory, and a first remote direct memory access interface;
      a secondary data processing host including a second memory, and a second remote direct memory access interface;

wherein the primary data processing host is configured to:
receive sequentially inbound messages; execute separate data processing components to process the inbound messages;

create in the first memory a first memory space for storing data items associated with the inbound messages wherein the first memory space is accessed by and is common to the separate data processing components;

execute a synchronization component to synchronize the first memory space and a second memory space of the second memory in the secondary data processing host with respect to one of the inbound messages at a time via the first and second remote direct memory access interfaces; and upon detecting a failover condition by the primary data processing host, reject further inbound messages and transmitting a failover message to the secondary data processing host; and wherein the secondary data processing host is configured to:

when determining, by the secondary data processing host, a synchronization state between the first memory space and the second memory space is higher than a predetermined threshold, process the further inbound messages by the secondary data processing host.

13. The fault tolerant data processing system of claim 12, wherein each of the separate data processing components accesses the first memory space via a memory index containing memory locations of data items in the first memory space.

14. The fault tolerant data processing system of claim 12, wherein the failover condition comprises a predetermined system health criteria for the primary data processing host.

15. The fault tolerant data processing system of claim 14, wherein the predetermined system health criteria comprises at least one of a processing component being in an alarming state, being in a nonresponsive state, or a predetermined amount of buildup of pending inbound messages.

16. The fault tolerant data processing system of claim 12, wherein the first memory space and the second memory space each comprise a message processing region and a transport region;

wherein the synchronization component in the primary data processing host is executed to synchronize data items between the transport region of the first memory space and the transport region of the second memory space via the first and second remote direct memory access interfaces; and wherein the message processing region of the second memory space is synchronized to the message processing region of the first memory space by updating the message processing region of the second memory space from the transport region of the second memory space within the secondary data processing host.

17. The fault tolerant data processing system of claim 12, wherein the primary data processing host is further configured to parse the inbound messages to obtain the data items associated with the inbound messages.

18. The fault tolerant data processing system of claim 12, wherein latency for the synchronization component via the first and second remote direct memory access interfaces is less than 10 microseconds.

19. The fault tolerant data processing system of claim 12, wherein the inbound messages are processed by the separate data processing components in the primary data processing host with strict order determined by an order in which the inbound messages are received by a call router of the primary data processing host.

20. The fault tolerant data processing system of claim 12, wherein the first memory space comprises:
a status array for indicating processing progression of the inbound messages;
a free queue containing currently unused memory addresses that are allocable to the separate data processing components; and
a finished queue containing data items associated with the inbound messages that have been completely processed by the separate data processing components.

* * * * *